D. C. HESSIAN.
AUTOMATIC AIR BRAKE RELEASING MECHANISM.
APPLICATION FILED FEB. 17, 1921.
1,415,173.
Patented May 9, 1922.
3 SHEETS—SHEET 1.
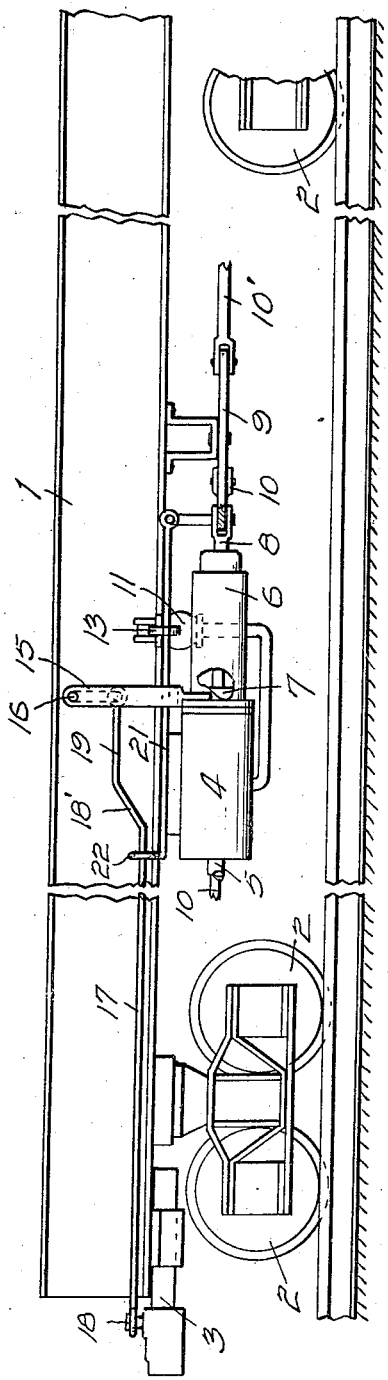
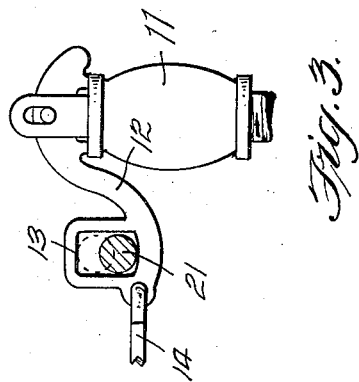
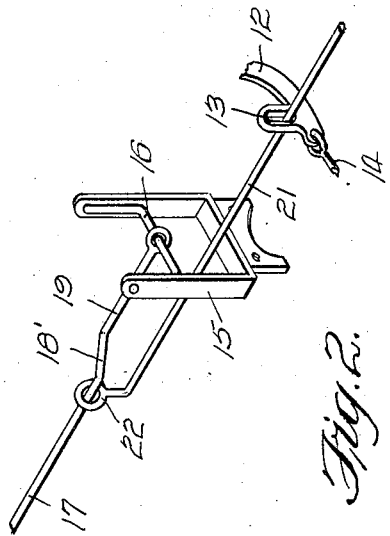
Inventor:
Dennis C. Hessian
By Fred J. Harrow,
Attorney.

Inventor:
Dennis C. Hessian.
By Fred J. Sharon
Attorney.

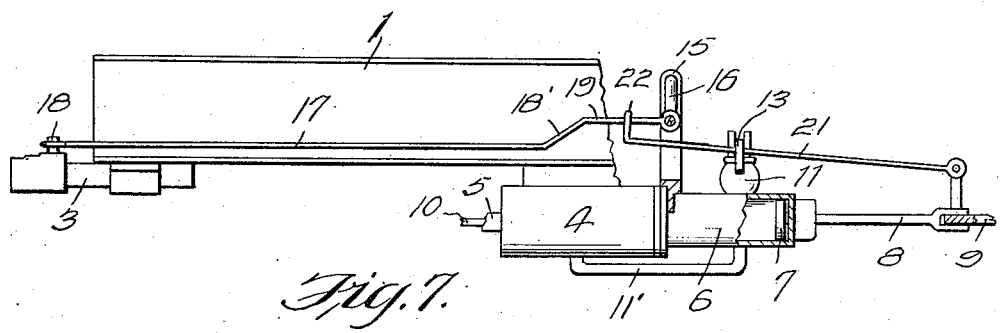
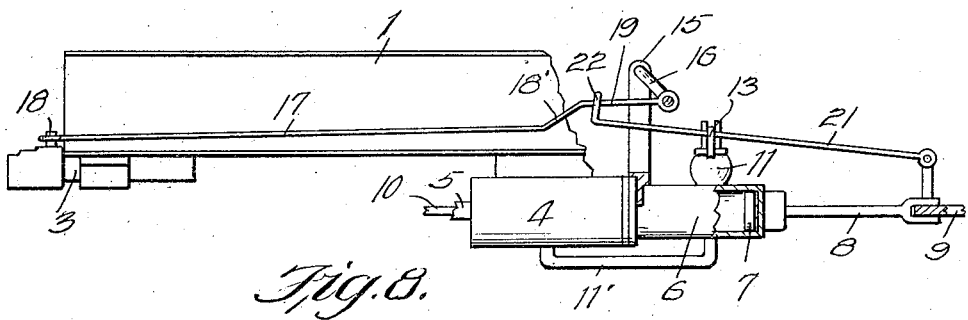
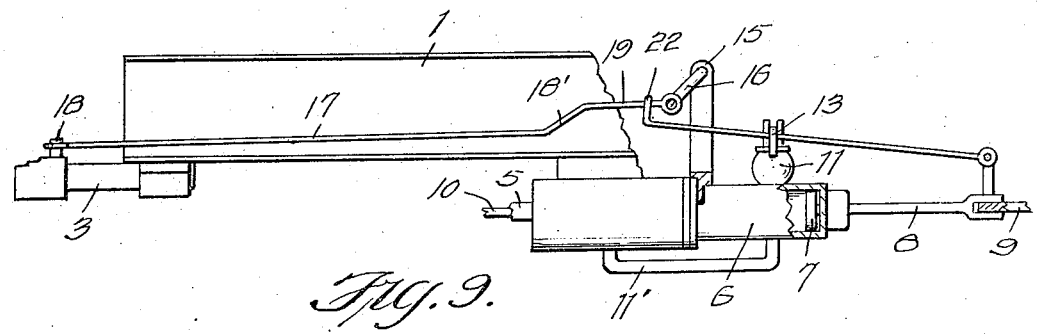

UNITED STATES PATENT OFFICE.

DENNIS C. HESSIAN, OF ST. LOUIS, MISSOURI.

AUTOMATIC AIR-BRAKE-RELEASING MECHANISM.

1,415,173.　　　　Specification of Letters Patent.　　Patented May 9, 1922.

Application filed February 17, 1921. Serial No. 445,812.

*To all whom it may concern:*

Be it known that I, DENNIS C. HESSIAN, a subject of the King of Great Britain, residing in the city of St. Louis and State of Missouri, have invented certain new and useful Automatic Air-Brake-Releasing Mechanism, of which the following is a specification.

My invention relates to an automatic air brake releasing mechanism, and, has for its object, the provision of means to be actuated by the movement of a piston rod and a draw-bar for actuating the lever of an air release valve for opening the valve and releasing air from the brake cylinder when the brakes of a car are set and cannot be released in the usual manner by the engineer, thus obviating the necessity of stopping the train to permit a trainman to locate the car whose brakes are set and actuate the air release valve by pulling on the usual rod extending from the valve to the side of the car.

A further object of the invention is the provision of means which will not actuate the air release valve by the usual to and fro movement of the draw-bar in taking up its slack, or play in either direction, but which will only open the air release valve when a sudden jar, jerk or movement is imparted to the draw-bar when the brakes of a car are set, such as by sudden starting or stopping the train, or, when in movement, suddenly increasing the speed, or decreasing the speed of the train causing the cars to pile up, thereby imparting the required force against the draw-bar, in one direction or the other, sufficient to cause the mechanism to open the air release valve and relieve the brake cylinder of its air pressure permitting the piston to return to its normal position, and, in so doing, automatically release the brakes from contact with the car wheels.

A still further object of the invention is the provision of means which is simple in construction and operation, practical and which will prove highly efficient for the purpose intended.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views:

Fig. 1, is a side elevation of a portion of a car provided with the usual air brake apparatus and showing my invention applied thereto.

Fig. 2, is a detail in perspective showing the essential part of my invention.

Fig. 3, is a detail showing the release valve lever and the rod that actuates, or lifts the lever for discharging the air pressure in the brake cylinder.

Fig. 7, is a diagrammatic view showing the piston extended causing the brake to be set, but showing the draw-bar in normal position thereby not effecting the air release valve.

Fig. 8, is a similar view, but showing the draw-bar as moved inwardly, or to the right, thus causing the opening of the air release valve thereby releasing the brakes.

Fig. 9, is a similar view, but showing the draw-bar as extended, or pulled outwardly to the left, thus causing the opening of the air release valve allowing the brake to release.

Figure 4:
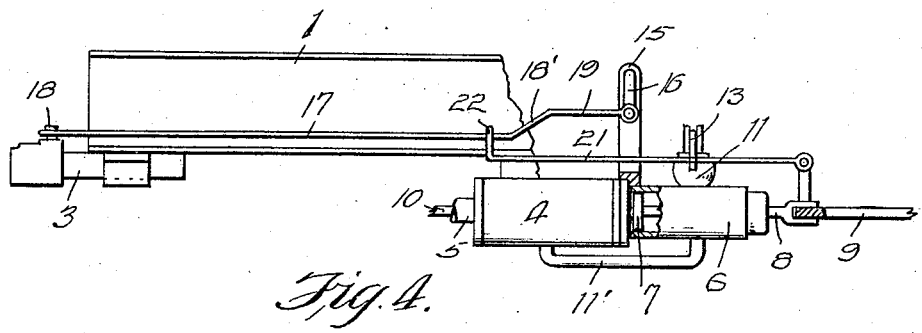
Fig. 4, is a diagrammatic view of the mechanism showing the same in the normal position it assumes when the brakes are not set.
Figure 5:
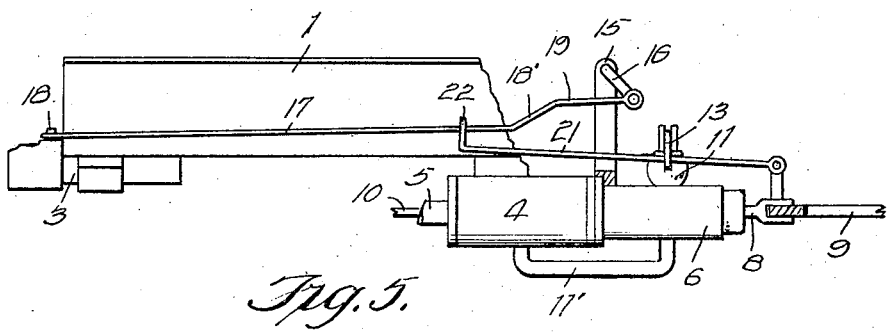
Fig. 5, is a similar view showing the draw-bar as moved inwardly, or to the right, but causing no effect upon the air release valve.
Figure 6:
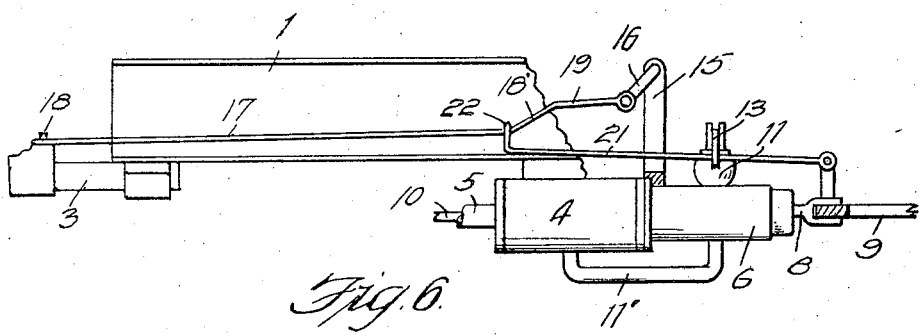
Fig. 6, is a similar view showing the draw-bar as pulled outwardly, or to the left from normal position, but causing no effect upon the air release valve.

Referring to the drawings, the reference character 1 designates the underframe of a car; 2 the wheels; 3 one of the draw-bars; 4 the auxiliary air reservoir; 5 train line pressure pipe; 6 the air brake cylinder; 7 the piston; 8 the piston rod having connection at its outer end with brake rod lever 9; 10 and 10' indicate brake rods for setting and releasing brake shoes, not shown. 11 indicates an air release valve mounted upon the free end of a pipe extending from the auxiliary air reservoir 4. 12 indicates the air release valve lever having a looped free end portion 13 to which is fixed the usual hand pull rod 14.

In carrying out the aim of my present invention, I employ a suitable upright bracket 15 and suitably fix the same to the brake cylinder 6. The bracket 15 has its upper end bifurcated and the arms thereof support, or carry a suitable oscillating crank, or swingable U-shaped member 16, as clearly shown in Fig. 2, the function of which is to open the air release valve.

A suitable connecting rod 17 unites or connects the U-shaped, or crank member 16 with a suitable pin 18 carried by the draw-bar 3, or some other associating part of the draw-bar that moves therewith. The connecting rod 17 is provided with the inclined section 18' thereby forming the inner raised, or elevated end 19 which end is suitably connected to the U-shaped, or crank member 16, as clearly shown in Fig. 2.

21 indicates a suitable rod having suitable connection at its outer end with the outer end of the piston rod 8, or with the brake rod lever 9, if desired. The inner end of the rod 21 is bent at a right angle to form a looped end 22 through which passes the draw-bar actuated rod 17, as clearly shown in Fig. 2. The rod 21, hereinafter known as the piston actuated rod, passes through the looped end portion 13 of the valve lever 12, as clearly shown in Figs. 2 and 3.

The operation of the device is as follows:

Assuming that the brakes, not shown, are set, owing to the fact that the piston 7 has been forced to its outermost position, as shown in Fig. 7, it will be observed, that the looped end 22 of the piston actuated rod 21 is moved from a riding position on the rod 17 to ride upon the raised inner end 19 of the draw-bar actuated rod 17, which movement raises the piston actuated rod 21 to an inclined position from the horizontal position, shown in Fig. 4. This movement also raises the rod 21 from its normal position to the upper end, of the looped end 13, of the valve lever 12, as shown in dotted lines in Fig. 3. Now, if a sudden jerk forward or rearward is imparted to the draw-bar 3, by sudden movement of the train when standing, it will be observed that the U-shaped, or crank member 16 is moved in an arcuate path, in one direction, or the other, which will further raise the inner end of the piston actuated rod 21 causing the same to assume a still greater inclined position than before, and, in so doing, raise the release valve lever 12 a sufficient distance to release or discharge the air within the auxiliary reservoir 4 which instantaneously releases air pressure upon the piston 7 permitting it to assume its normal, or innermost position, thus releasing the brakes, through the cross lever 9 and brake rods 10 and 10', as is manifest.

When a train is running with all car brakes set, the cars can only be jerked from front end by working steam on engine, as each draw-bar is at tension and while working to and from a little, it will not jerk enough to operate the release valve, so as to release brakes when going down a grade, or the like.

From the foregoing description, it is evident that I have provided a mechanism which will automatically actuate an air release valve and release the set brakes of a car, should the car brakes be stuck for any one of several causes, as is manifest.

The many advantages of the herein described invention will readily suggest themselves to those skilled in the art to which it appertains.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and the terms of the following claims, hence I wish it to be understood that I reserve the right to make any such changes, or modifications as may fairly fall within the scope of the appended claims when fairly construed.

What I claim is:

1. An automatic air brake release mechanism comprising, in combination, with a draw-bar, a brake cylinder having a piston movable therein and the piston rod, an air release pipe extending from the auxiliary air cylinder, a release valve mounted at the free end of said pipe, and means for opening the air release valve by a sudden movement of the draw-bar in either direction when the brakes are set, thereby discharging the air from the brake cylinder permitting the piston to return to its normal position releasing the brakes.

2. An automatic air brake release mechanism comprising, in combination, with a draw-bar, a brake cylinder having a piston movable therein and the piston rod, a U-shaped swinging member, means for supporting said member, a connection between the draw-bar and the U-shaped member, said connection having an elevated inner end, a connection between the outer end of the piston rod and aforesaid connection, said connection passing through the air release lever with the free end of the latter connection being slidably mounted upon the former so that when the usual slack of the draw-bar is taken up that the movement thereof will not cause the air release valve to be opened.

3. An automatic air brake release mechanism comprising, in combination, with a draw-bar, a brake cylinder having a piston movable therein and the piston rod, a swinging member supported adjacent the brake cylinder, a connection between said member and the draw-bar for moving said member in an arcuate path when movement is imparted to the draw-bar, in either direction, by sudden starting or stopping of the train, a connection between the free end of the piston rod and said first mentioned connection, said piston connection passing through a looped end of the air release valve lever for actuating the lever to open the valve when the brakes of the car are set and a sudden movement in either direction is imparted to the draw-bar.

4. An automatic air brake release mechanism comprising, in combination, with a draw-bar, a brake cylinder having a piston movable therein and the piston rod, a swinging member supported adjacent the brake cylinder, a rod connecting the draw-bar with said swinging member, said rod having an elevated off set at its end nearest the swinging element, a rod connected at one end to move with the rod of the piston, the opposite end of said valve rod being provided with a loop to ride upon the off set rod, said rod engaging the lever of the air release rod intermediate its ends for opening the air release valve when the brakes are set and a sudden longitudinal movement is imparted in either direction to the draw-bar by a sudden starting or stopping of the train.

In testimony whereof, I have hereunto signed my name to the specification.

DENNIS C. HESSIAN.